(12) United States Patent
Tokuda et al.

(10) Patent No.: US 11,573,541 B2
(45) Date of Patent: Feb. 7, 2023

(54) FUTURE STATE ESTIMATION DEVICE AND FUTURE STATE ESTIMATION METHOD

(71) Applicant: Hitachi, Ltd., Tokyo (JP)

(72) Inventors: Yuya Tokuda, Tokyo (JP); Takuya Yoshida, Tokyo (JP); Takayasu Kasahara, Tokyo (JP); Tatsurou Yashiki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 16/971,806

(22) PCT Filed: Feb. 4, 2019

(86) PCT No.: PCT/JP2019/003783
§ 371 (c)(1),
(2) Date: Aug. 21, 2020

(87) PCT Pub. No.: WO2019/176370
PCT Pub. Date: Sep. 19, 2019

(65) Prior Publication Data
US 2020/0393800 A1      Dec. 17, 2020

(30) Foreign Application Priority Data

Mar. 14, 2018   (JP) .............................. JP2018-046389

(51) Int. Cl.
*G05B 13/04* (2006.01)
*G06F 3/14* (2006.01)
(Continued)

(52) U.S. Cl.
CPC ........... *G05B 13/048* (2013.01); *G05B 17/02* (2013.01); *G05B 23/02* (2013.01); *G06F 3/14* (2013.01); *G06Q 10/04* (2013.01); *G06Q 10/067* (2013.01)

(58) Field of Classification Search
CPC ...... G05B 13/048; G05B 17/02; G05B 23/02; G06F 3/14; G06Q 10/04; G06Q 10/067
See application file for complete search history.

(56) References Cited

U.S. PATENT DOCUMENTS

2007/0005317 A1   1/2007  Paxson et al.
2009/0248375 A1   10/2009 Billiotte et al.
(Continued)

FOREIGN PATENT DOCUMENTS

EP    3 260 942 A1    12/2017
JP    2009-76036 A    4/2009
(Continued)

OTHER PUBLICATIONS

Extended European Search Report issued in European Application No. 19766459.2 dated Oct. 21, 2021 (nine (9) pages).
(Continued)

*Primary Examiner* — Tejal Gami
(74) *Attorney, Agent, or Firm* — Crowell & Moring LLP

(57) ABSTRACT

An objective of the present invention is to provide a future state estimation method and future state estimation device with which, given that the space in which the estimation is carried out is finite, it is possible to rapidly estimate the states of a controlled object and the peripheral environment thereof in the form of probability density distribution for infinite future. Provided is a future state estimation device characterized by comprising: a model storage part for saving a model for simulating a subject of simulation and the peripheral environment of the subject of simulation; a future state forecast result storage part for storing information obtained by estimating future states of the subject of simulation and the peripheral environment of the subject of simulation within a finite space in the form of probability density distribution, for either an infinite time or a given time step in the future; and a future state forecast compu-
(Continued)

tation part for carrying out calculation, which is equivalent to a series, using the model for simulating the future states of the subject of simulation and the peripheral environment of the subject of simulation in the form of probability density distribution.

15 Claims, 11 Drawing Sheets

(51) Int. Cl.
*G05B 23/02* (2006.01)
*G05B 17/02* (2006.01)
*G06Q 10/04* (2012.01)
*G06Q 10/06* (2012.01)

(56) References Cited

U.S. PATENT DOCUMENTS

2016/0325743 A1 11/2016 Schmuedderich et al.
2017/0255177 A1 9/2017 Tokuda et al.

FOREIGN PATENT DOCUMENTS

| JP | 2013-114666 A | 6/2013 |
| JP | 2016-212872 A | 12/2016 |
| JP | 2017-157112 A | 9/2017 |

OTHER PUBLICATIONS

International Search Report (PCT/ISA/210) issued in PCT Application No. PCT/JP2019/003783 dated May 14, 2019 with English translation (four pages).
Japanese-language Written Opinion (PCT/ISA/237) issued in PCT Application No. PCT/JP2019/003783 dated May 14, 2019 (three pages).

FIG. 1

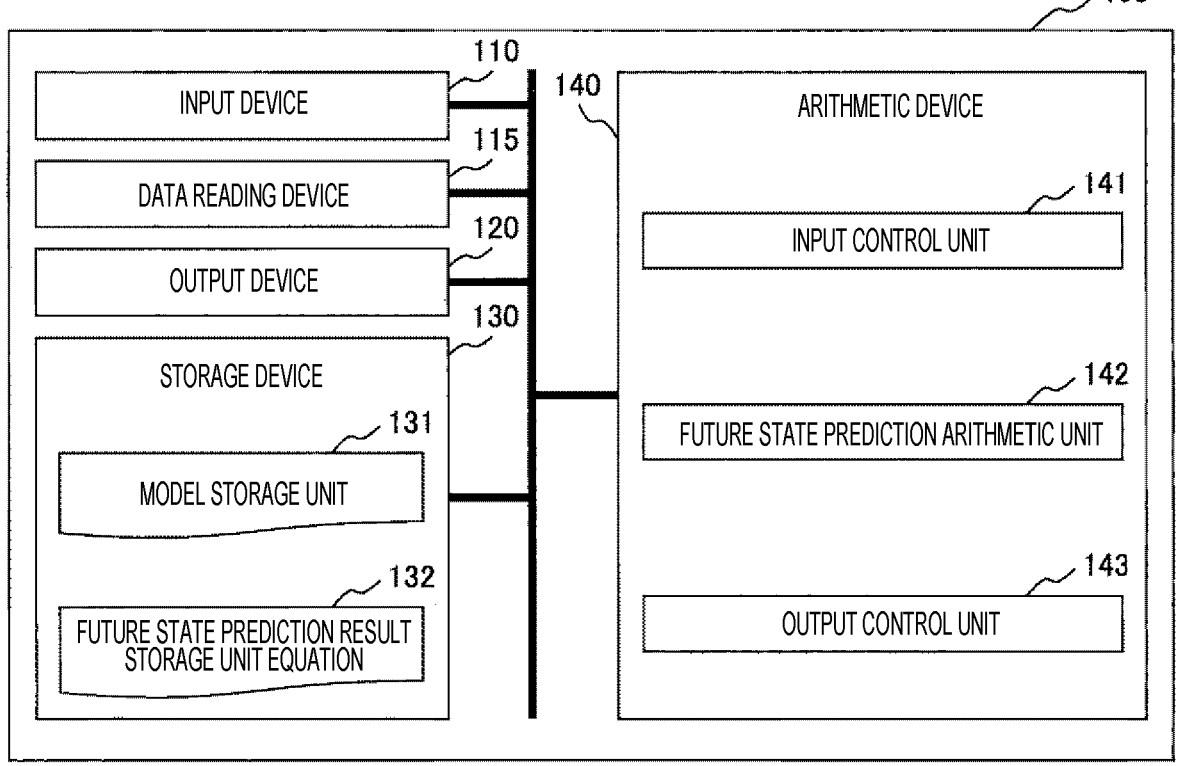

100 (device)
- 110 INPUT DEVICE
- 115 DATA READING DEVICE
- 120 OUTPUT DEVICE
- 130 STORAGE DEVICE
  - 131 MODEL STORAGE UNIT
  - 132 FUTURE STATE PREDICTION RESULT STORAGE UNIT EQUATION
- 140 ARITHMETIC DEVICE
  - 141 INPUT CONTROL UNIT
  - 142 FUTURE STATE PREDICTION ARITHMETIC UNIT
  - 143 OUTPUT CONTROL UNIT

FIG. 2

Tij, Ti+2,j+2, Ti+1,j+1

| STATE ID OF TRANSITION SOURCE ($S_i$) \ STATE ID OF TRANSITION DESTINATION ($S_j$) | $S_1$ | $S_2$ | $S_3$ | $S_4$ | ... | $S_n$ |
|---|---|---|---|---|---|---|
| $S_1$ | 0.50 | 0.50 | 0.00 | 0.00 | | 0.00 |
| $S_2$ | 0.00 | 0.25 | 0.5 | 0.25 | | 0.00 |
| $S_3$ | 0.00 | 0.00 | 0.33 | 0.33 | ... | 0.00 |
| $S_4$ | 0.00 | 0.00 | 0.00 | 0.10 | | 0.00 |
| ... | ... | ... | ... | ... | | ... |
| $S_n$ | 0.00 | 0.00 | 0.00 | 0.00 | | 0.37 |

| STATE ID OF TRANSITION SOURCE (Si) | $S_1$ | $S_2$ | $S_3$ | $S_4$ | ... | $S_n$ |
|---|---|---|---|---|---|---|
| REWARD | 0.00 | 0.00 | 1.00 | 0.00 | .. | 0.00 |

| STATE ID OF TRANSITION SOURCE (Si) | $S_1$ | $S_2$ | $S_3$ | $S_4$ | ... | $S_n$ |
|---|---|---|---|---|---|---|
| OPERATION AMOUNT ID (a1) | $a_{21}$ | $a_6$ | $a_2$ | $a_5$ | ... | $a_{13}$ |

FIG. 8

| STATE ID OF TRANSITION SOURCE (Si) | $S_1$ | $S_2$ | $S_3$ | $S_4$ | ... | $S_n$ |
|---|---|---|---|---|---|---|
| VALUE | 0.89 | 0.90 | 1.00 | 0.90 | ... | 0.01 |

| STATE ID OF TRANSITION SOURCE (Si) | $S_1$ | $S_2$ | $S_3$ | $S_4$ | ... | $S_n$ |
|---|---|---|---|---|---|---|
| STATE ID OF TRANSITION DESTINATION (Sj) | $S_2$ | $S_3$ | $S_3$ | $S_3$ | ... | $S_5$ |

FIG. 11

OUTPUT SCREEN: STATE TRANSITION MATRIX T

| | | \multicolumn{5}{c|}{STATE ID OF TRANSITION DESTINATION (Sj)} |
|---|---|---|---|---|---|---|
| | | $S_1$ | $S_2$ | $S_3$ | $S_4$ | $S_5$ |
| STATE ID OF TRANSITION SOURCE (Si) | $S_1$ | 0.50 | 0.50 | 0.00 | 0.00 | 0.00 |
| | $S_2$ | 0.00 | 0.25 | 0.5 | 0.25 | 0.00 |
| | $S_3$ | 0.00 | 0.00 | 0.33 | 0.33 | 0.33 |
| | $S_4$ | 0.00 | 0.00 | 0.00 | 0.25 | 0.25 |
| | $S_5$ | 0.00 | 0.00 | 0.00 | 0.00 | 0.10 |

FIG. 12

OUTPUT SCREEN: ATTENUATION TYPE STATE TRANSITION MATRIX D

| | | \multicolumn{5}{c|}{STATE ID OF TRANSITION DESTINATION (Sj)} |
|---|---|---|---|---|---|---|
| | | $S_1$ | $S_2$ | $S_3$ | $S_4$ | $S_5$ |
| STATE ID OF TRANSITION SOURCE (Si) | $S_1$ | 0.14 | 0.15 | 0.09 | 0.08 | 0.25 |
| | $S_2$ | 0.06 | 0.07 | 0.11 | 0.95 | 0.31 |
| | $S_3$ | 0.06 | 0.04 | 0.07 | 0.08 | 0.38 |
| | $S_4$ | 0.08 | 0.05 | 0.03 | 0.06 | 0.32 |
| | $S_5$ | 0.07 | 0.04 | 0.02 | 0.02 | 0.46 |

| STATE ID | TEMPERATURE [°C] | PRESSURE [Mpa] | FLOW RATE [t/h] |
|---|---|---|---|
| $S_1$ | 295 TO 300 | 3.4 TO 3.5 | 0.0 TO 0.5 |
| $S_2$ | 300 TO 305 | 3.4 TO 3.5 | 0.0 TO 0.5 |
| $S_3$ | 305 TO 310 | 3.4 TO 3.5 | 0.0 TO 0.5 |
| $S_4$ | 310 TO 315 | 3.4 TO 3.5 | 0.0 TO 0.5 |
| ... | ... | ... | ... |
| $S_n$ | 405 TO 410 | 4.4 TO 4.5 | 14.5 TO 15.0 |

FIG. 15

| OUTPUT SCREEN: REWARD FUNCTION, CONTROL LAW, STATE VALUE FUNCTION, OTHERS | | | | | | |
|---|---|---|---|---|---|---|
| REWARD FUNCTION: TEMPERATURE 295-300  PRESSURE 3.4-3.5  FLOW RATE 0.0-0.5 | | | | | | |
| STATE ID OF TRANSITION SOURCE | $S_1$ | $S_2$ | $S_3$ | $S_4$ | $S_5$ | $S_6$ |
| REWARD | 0.00 | 0.00 | 1.00 | 0.00 | 0.00 | 0.00 |
| CONTROL LAW: | | | | | | |
| STATE ID OF TRANSITION SOURCE | $S_1$ | $S_2$ | $S_3$ | $S_4$ | $S_5$ | $S_6$ |
| OPERATION AMOUNT ID | $a_{21}$ | $a_8$ | $a_2$ | $a_5$ | $a_{12}$ | $a_{13}$ |
| STATE VALUE FUNCTION: | | | | | | |
| STATE ID OF TRANSITION SOURCE | $S_1$ | $S_2$ | $S_3$ | $S_4$ | $S_5$ | $S_6$ |
| VALUE | 0.81 | 0.90 | 1.00 | 0.90 | 0.81 | 0.72 |
| OPTIMAL STATE OF TRANSITION DESTINATION FROM EACH STATE OF TRANSITION SOURCE: | | | | | | |
| STATE ID OF TRANSITION SOURCE | $S_1$ | $S_2$ | $S_3$ | $S_4$ | $S_5$ | $S_6$ |
| STATE ID OF TRANSITION DESTINATION | $S_2$ | $S_3$ | $S_3$ | $S_3$ | $S_4$ | $S_5$ |

FIG. 17

CHECK SCREEN: CHECK WHETHER OR NOT MODEL UPDATE IS POSSIBLE

■ MODEL UPDATE CONTENT:

• BEFORE MODEL UPDATE:

| | TEMPERATURE | PRESSURE | FLOW RATE | STATE ID | TRANSITION PROBABILITY |
|---|---|---|---|---|---|
| TRANSITION SOURCE | 307 [°C] | 3.4 [MPa] | 0.4 [t/h] | $S_3$ | 20 [%] |
| TRANSITION DESTINATION | 316 [°C] | 3.5 [MPa] | 0.5 [t/h] | $S_5$ | |

• AFTER MODEL UPDATE:

| | TEMPERATURE | PRESSURE | FLOW RATE | STATE ID | TRANSITION PROBABILITY |
|---|---|---|---|---|---|
| TRANSITION SOURCE | 307 [°C] | 3.4 [MPa] | 0.4 [t/h] | $S_3$ | 23 [%] |
| TRANSITION DESTINATION | 316 [°C] | 3.5 [MPa] | 0.5 [t/h] | $S_5$ | |

■ UPDATE OF CONTROL LAW ACCOMPANYING MODEL UPDATE:

• BEFORE CONTROL LAW UPDATE:

| STATE ID OF TRANSITION SOURCE | $S_1$ | $S_2$ | $S_3$ | $S_4$ | $S_5$ | $S_6$ |
|---|---|---|---|---|---|---|
| OPERATION AMOUNT ID | $a_{21}$ | $a_6$ | $a_2$ | $a_5$ | $a_{12}$ | $a_{13}$ |

• AFTER CONTROL LAW UPDATE:

| STATE ID OF TRANSITION SOURCE | $S_1$ | $S_2$ | $S_3$ | $S_4$ | $S_5$ | $S_6$ |
|---|---|---|---|---|---|---|
| OPERATION AMOUNT ID | $a_{21}$ | $a_6$ | $a_1$ | $a_5$ | $a_{12}$ | $a_{13}$ |

■ CHANGE IN STATE TRANSITION PREDICTION RESULT BY ELAPSE OF TIME ACCOMPANYING UPDATE OF CONTROL LAW:

• INITIAL STATE: $S_3$

• BEFORE CONTROL LAW UPDATE:  • AFTER CONTROL LAW UPDATE:

■ PERMISSION OF MODEL UPDATE:

| PERMIT | DECLINE | HOLD |
|---|---|---|
| 106 | 107 | 108 |

FIG. 18

CHECK SCREEN: CHECK WHETHER OR NOT MODEL UPDATE IS POSSIBLE

■ MODEL UPDATE CONTENT:

• BEFORE MODEL UPDATE:

STATE TRANSITION MATRIX

|  | | STATE ID OF TRANSITION DESTINATION | | | | |
|---|---|---|---|---|---|---|
| | | $S_1$ | $S_2$ | $S_3$ | $S_4$ | $S_5$ |
| STATE ID OF TRANSITION SOURCE | $S_1$ | 0.50 | 0.50 | 0.00 | 0.00 | 0.00 |
| | $S_2$ | 0.00 | 0.25 | 0.5 | 0.25 | 0.00 |
| | $S_3$ | 0.00 | 0.00 | 0.33 | 0.33 | 0.33 |
| | $S_4$ | 0.00 | 0.00 | 0.00 | 0.25 | 0.25 |
| | $S_5$ | 0.00 | 0.00 | 0.00 | 0.00 | 0.10 |

• AFTER MODEL UPDATE:

STATE TRANSITION MATRIX

|  | | STATE ID OF TRANSITION DESTINATION | | | | |
|---|---|---|---|---|---|---|
| | | $S_1$ | $S_2$ | $S_3$ | $S_4$ | $S_5$ |
| STATE ID OF TRANSITION SOURCE | $S_1$ | 0.50 | 0.45 | 0.05 | 0.00 | 0.00 |
| | $S_2$ | 0.00 | 0.25 | 0.5 | 0.25 | 0.00 |
| | $S_3$ | 0.00 | 0.00 | 0.33 | 0.33 | 0.33 |
| | $S_4$ | 0.00 | 0.00 | 0.00 | 0.25 | 0.25 |
| | $S_5$ | 0.00 | 0.00 | 0.00 | 0.00 | 0.10 |

■ UPDATE OF CONTROL LAW ACCOMPANYING MODEL UPDATE:

• BEFORE CONTROL LAW UPDATE:

| STATE ID OF TRANSITION SOURCE | $S_1$ | $S_2$ | $S_3$ | $S_4$ | $S_5$ | $S_6$ |
|---|---|---|---|---|---|---|
| OPERATION AMOUNT ID | $a_{21}$ | $a_6$ | $a_2$ | $a_5$ | $a_{12}$ | $a_{13}$ |

• AFTER CONTROL LAW UPDATE:

| STATE ID OF TRANSITION SOURCE | $S_1$ | $S_2$ | $S_3$ | $S_4$ | $S_5$ | $S_6$ |
|---|---|---|---|---|---|---|
| OPERATION AMOUNT ID | $a_{21}$ | $a_6$ | $a_1$ | $a_5$ | $a_{12}$ | $a_{13}$ |

■ CHANGE IN STATE TRANSITION PREDICTION RESULT BY ELAPSE OF TIME ACCOMPANYING UPDATE OF CONTROL LAW:

• INITIAL STATE: $S_3$

• BEFORE CONTROL LAW UPDATE:

• AFTER CONTROL LAW UPDATE:

■ PERMISSION OF MODEL UPDATE:

| PERMIT | DECLINE | HOLD |
|---|---|---|
| 106 | 107 | 108 |

FUTURE STATE ESTIMATION DEVICE AND FUTURE STATE ESTIMATION METHOD

TECHNICAL FIELD

The present invention mainly relates to a future state estimation device and a future state estimation method for calculating a control law at high speed in consideration of a long-term future state.

BACKGROUND ART

Model predictive control, which is generally applied in the fields of automobiles and plants (power and industrial), has the need to predict states of a control object and its surrounding environment in a more distant future.

A device and a method described below exist for predicting future states of an operation target and its surrounding environment.

PTL 1 discloses a method of predicting a future state using a model simulating a control object and its surrounding environment, and calculating an operation amount suitable for the future state.

PTL 2 discloses a method of predicting present and future states of an industrial system as a control object and optimizing a control law so as to maximize an objective function.

PTL 3 discloses a method in which a nonlinear and dynamic system such as a heat reaction furnace process is modeled by a regression method, and an optimal operation amount is calculated using a future state predicted by the model.

PTL 4 is a control parameter automatic adjustment apparatus that can automatically optimize a control parameter according to a purpose while satisfying a constraint condition in plant operation and also shorten a calculation time required for optimization of the control parameter. A method of calculating a control law considering a future state by using a plant model and a machine learning method such as reinforcement learning is disclosed.

CITATION LIST

Patent Literature

PTL 1: JP 2016-212872 A
PTL 2: JP 2013-114666 A
PTL 3: JP 2009-076036 A
PTL 4: JP 2017-157112 A

SUMMARY OF INVENTION

Technical Problem

PTLs 1, 2, 3, and 4 predict a future state using a model simulating a control object and its surrounding environment, and calculate an optimal control method from the predicted future state. Although there is the need to predict a more distant future state, a method using iterative calculation requires a longer time for prediction calculation as time to a future state to be predicted is longer. In view of the above, up to a future state in a predictable finite time is generally calculated under the constraints of computer performance and a control period.

In view of the above, an object of the present invention is to provide a future state estimation method and a future state estimation device with which, within space in a finite state defined in advance, it is possible to rapidly estimate states of a control object and its surrounding environment in an infinite time ahead in a form of probability density distribution.

Solution to Problem

From the above, the present invention provides "A future state estimation device including a model storage unit that stores a model for simulating a simulation target and a surrounding environment of the simulation target, a future state prediction result storage unit that stores information obtained by estimating future states of the simulation target and a surrounding environment of the simulation target in infinite time or a time step ahead within finite space in a form of probability density distribution, and a future state prediction arithmetic unit that performs calculation equivalent to a series using a model for simulating future states of the simulation target and a surrounding environment of the simulation target in a form of probability density distribution."

Further, the present invention provides "a future state estimation device including a model storage unit that stores a model for simulating a simulation target and a surrounding environment of the simulation target, a future state prediction result storage unit that stores information obtained by estimating future states of the simulation target and a surrounding environment of the simulation target in infinite time or a time step ahead within finite space in a form of probability density distribution, means for performing calculation equivalent to a series using a model for simulating a simulation target and a surrounding environment of the simulation target, and a model update unit that updates information of the model storage unit by using information and data on transition of a state."

Further, the present invention provides "a future state estimation method including storing a model for simulating a simulation target and a surrounding environment of the simulation target, storing information obtained by estimating future states of the simulation target and a surrounding environment of the simulation target in infinite time or a time step ahead within finite space in a form of probability density distribution, and performing calculation equivalent to a series using a model for simulating future states of the simulation target and a surrounding environment of the simulation target in a form of probability density distribution."

Further, the present invention provides "a future state estimation method including, in estimating a future state using a model that simulates behavior of a simulation target, storing, for a state of a transition source and a state of a transition destination before and after state transition, probability that the state of a transition source becomes the state of a transition destination as a state transition probability matrix, and obtaining an attenuation type state transition matrix which is a sum of the state transition probability matrices added with a weight that decreases more for a more distant future in a plurality of transitions.

Advantageous Effects of Invention

According to the present invention, it is possible to calculate future states of a control object and its surrounding environment in an infinite time ahead in a form of probability density distribution without depending on the time to a future state to be predicted.

Further, according to an embodiment of the present invention, by using this calculation result, it is possible to calculate an optimal control law in consideration of a future state in an infinite time ahead.

Further, according to an embodiment of the present invention, a route optimization method considering all routes that may exist in the field of automatic design, a pricing method considering a distant future state in the field of finance, and a metabolic pathway optimization method considering all routes within a modelable range in the field of bioengineering can be performed.

BRIEF DESCRIPTION OF DRAWINGS

FIG. 1 is a configuration diagram showing an example of a processing device implemented with a high-speed estimation method for a long-term future state according to a first embodiment of the present invention.

FIG. 2 is a diagram showing an example of a case where a format of a model stored in a model storage unit 131 is a state transition probability matrix T.

FIG. 8 is a diagram showing an example of a state value function V.

FIG. 9 is a diagram showing an example of a calculation result of Equation (4).

FIG. 11 is a diagram showing an example in which the state transition probability matrix T is displayed on a screen as an example of model data recorded in the model storage unit 131.

FIG. 12 is a diagram showing an example in which an attenuation type state transition matrix D stored in a future state prediction result storage unit 132 is displayed on a screen.

FIG. 15 is a diagram showing an example in which a table showing a reward function R, a control law, a state value function, and a state $s_j^*$ for a transition source state $s_i$ is displayed on a screen.

FIG. 17 is a diagram showing an example of a screen displayed on a screen when model data recorded in the model storage unit 131 is updated.

FIG. 18 is a diagram showing an example of a screen different from that of FIG. 17 in a method of displaying update content (before and after update) of a model.

DESCRIPTION OF EMBODIMENTS

Figure 3:
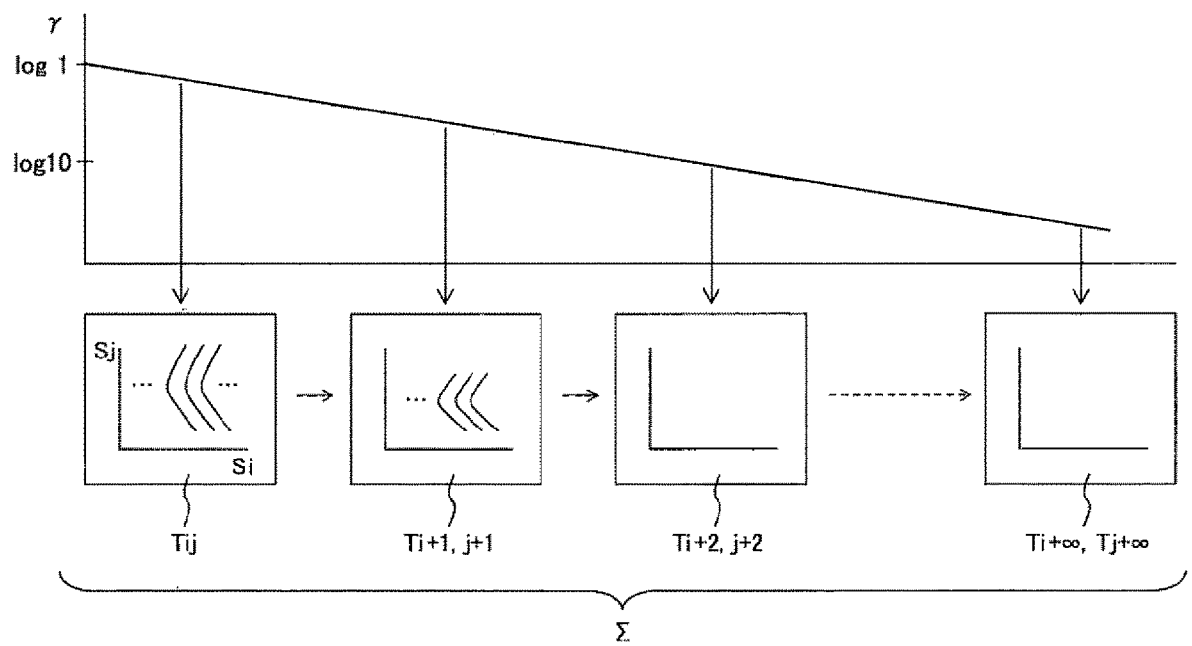
FIG. 3 is a diagram schematically showing processing of Equation (1).

Hereinafter, an embodiment will be described with reference to the drawings.

First Embodiment

FIG. 1 is a configuration diagram showing an example of a processing device 100 implemented with a high-speed estimation method for a long-term future state according to a first embodiment of the present invention. The processing device 100 includes an input device 110, a data reading device 115, an output device 120, a storage device 130, and an arithmetic device 140 as main elements.

Of these, the input device 110 is a part that receives an instruction from an operator, and includes a button, a touch panel, and the like.

The data reading device 115 is a part that receives data from the outside of the processing device 100, and includes a CD drive, a USB terminal, a LAN cable terminal, a communication device, and the like.

The output device 120 is a device that outputs instruction information to an operator, a read image, a read result, and the like, and includes a display and a communication device.

The above configurations are standard ones, and any or all of the input device 110, the data reading device 115, and the output device 120 may be connected to the outside of the processing device 100.

The storage device 130 is a part that stores various types of data, and includes a model storage unit 131 and a future state prediction result storage unit 132. Of these, the model storage unit 131 is a part that stores a model that simulates the behavior of an object or a phenomenon that is a target of predicting a future state in the processing device 100. Further, the future state prediction result storage unit 132 is a part that stores a calculation result of a future state prediction arithmetic unit 142 described later. Details of the storage device 130 will be described later, and only schematic functions are described here.

The arithmetic device 140 processes data input from the input device 110 and the data reading device 115 and data stored in the storage device 130, outputs a result of the processing to the output device 120 or records the result in the storage device 130, and includes processing units (an input control unit 141, the future state prediction result storage unit 132, and an output control unit 143).

The input control unit 141 is a part that divides data input from the input device 110 or the data reading device 115 into commands, models, and the like, and transfers the data to each unit of the storage device 130 and the arithmetic device 140.

The future state prediction arithmetic unit 142 calculates an attenuation type state transition matrix from model data stored in the model storage unit 131, and records the matrix in the future state prediction result storage unit 132.

The output control unit 143 is a part that outputs data stored in the storage device 130 to the output device 120. When an output destination is a screen or the like, it is preferable that a result is output each time reading operation is performed. When an output destination is a communication destination or the like, output processing may be performed each time a state transition probability matrix is updated or calculation of the future state prediction arithmetic unit 142 is performed, or may be performed in such a manner that pieces of data of a plurality of times are collected, pieces of data are collected at predetermined time intervals, or the like.

Hereinafter, details of processing executed by using the processing device 100 of FIG. 1 will be described. Note that, in description hereinafter, an object or a phenomenon that is a target of predicting a future state will be referred to as a simulation target in the present invention. Examples of the simulation targets include behavior of machines and living things, natural and physical phenomena, chemical reactions, changes in money and prices, and changes in consumer demand. However, the simulation targets are not limited to these examples in the present invention.

Input of a model in the present invention is a state of a simulation target and elapse of time, influencing factors such as operation, disturbance, and the like, and output is a state of the simulation target after being influenced by the influencing factors. In the present invention, this model will be referred to as a state transition model. Models such as a state transition model are stored in the model storage unit 131 of FIG. 1. Further, a state transition model expresses states of a simulation target and its surrounding environment in infinite time or at infinite step ahead in finite state space in a form of probability density distribution.

As an example of a storage format of a state transition model in the model storage unit 131, for example, a state transition probability matrix, a neural network, a radial basis function network, or a matrix expressing a weight of a neural network or a radial basis function network can be considered. However, the present invention does not limit the model storage format of a simulation target to these examples.

FIG. 2 shows an example of a case where a format of a model stored in the model storage unit 131 is a state transition probability matrix T. FIG. 2 shows a state si (i=1, 2, . . . , n) of a transition source and a state sj (j=1, 2, . . . , n) of a transition destination in a vertical and horizontal matrix. State transition probability P (sj|si) is numerically displayed in the matrix. The transition probability matrix T is generally a kind of a model that simulates a motion characteristic and a physical phenomenon of a control object, and is a function or matrix that stores transition probability between all states. Here, the row of the table is the state si (i=1, 2, . . . , n) of a transition source, the column is the state sj (j=1, 2, . . . , n) of a transition destination, and the element Tij is the probability P (sj|si) that the state transits from the state si to the state sj when the set time interval $\Delta t$ (or step) elapses.

Regarding a simulation target to which the present invention is applied, when states of the simulation target and its surrounding environment in the infinite time or an infinite step ahead in the form of probability density distribution, calculation time may be independent of any one or more of a distance to a future state to be estimated, time, and a step. In a case where the state transition probability P (sj|si) does not depend on time, a step τ indicating an amount and the number of times an influencing factor interferes with the simulation target may be used instead of time t.

FIG. 2 shows that, when a focus is placed on s1 of the state si of a transition source, the probability P (s1|s1) of becoming s1 of the state sj of a transition destination after the elapsed time $\Delta t$ is 0.5, the probability P (s2|s1) of becoming s2 is 0.5, and the probability P (s3|s1) of becoming s3 or more is 0. Similarly, when a focus is placed on s2, the probability P (s1|s2) of becoming s1 of the state sj of a transition destination after the elapsed time $\Delta t$ is 0, the probability P (s2|s2) of becoming s2 is 0.25, the probability P (s3|s2) of becoming s3 is 0.5, and the probability P (s4|s1) of becoming s4 is 0.25. Note that the table of FIG. 2 shows the states of a transition source and the probability of a moving destination of movement after transition, so this table can be regarded as a table of probability density distribution. The probability density distribution shows, for example, a mountain shape.

Note that, in the above description, for the state transition probability matrix T, the table Tij showing only one cross section before and after the elapsed time $\Delta t$ is illustrated. However, in reality, tables at intervals of the elapsed time $\Delta t$ are continuously present, and the state transition probability matrix T that is a model stored in the model storage unit 131 is formed. A table after the elapsed time $\Delta t$ of the table Tij is Ti+1, j+1, and a table after the elapsed time $\Delta t$ is Ti+2, j+2.

In the example of FIG. 2, a state s is handled as discrete space in which the whole is divided by n into ranges. However, by using a neural network, a radial basis function network, and the like, the state s can be handled as continuous space. Further, in a case where a neural network, a radial basis function network, or the like is used, the state transition probability matrix T may be substituted with a matrix having a weight coefficient of an input signal entering a neuron or a weight coefficient of a basis function as an element value.

Returning to FIG. 1, the future state prediction result storage unit 132 is a part that stores a calculation result of the future state prediction arithmetic unit 142. In the present invention, data stored in the future state prediction result storage unit 132 will be referred to as an attenuation type state transition matrix. The attenuation type state transition matrix and its calculation method will be described later.

The future state prediction arithmetic unit 142 calculates an attenuation type state transition matrix from model data recorded in the model storage unit 131, and records the matrix in the future state prediction result storage unit 132. An example of a method of calculating the attenuation type state transition matrix is shown in Equation (1) below. Note that, in the example of Equation (1), the state transition probability matrix T is assumed as a storage format of a model in the model storage unit 131.

[Equation 1]

$$D = +\gamma T^2 + \gamma^2 T^3 + \ldots + \gamma^{\infty-1} T^\infty \qquad (1)$$

In Equation (1), D is an attenuation type state transition matrix, and γ is a constant of 0 or more and less than 1 referred to as an attenuation rate. Further, Tk is a function (or matrix) that stores transition probabilities between all states when the time of $\Delta t \times k$ elapses.

FIG. 3 is a diagram schematically showing the processing of Equation (1), in which a plurality of state transition probability matrices Tij for the elapsed time $\Delta t$ in FIG. 2 are multiplied by a weighting coefficient γ that attenuates at each of the elapsed time $\Delta t$, and the total of them is calculated. Note that, in FIG. 3, the probability distribution showing the state si of a transition source and the state sj of a transition destination in a plurality of the state transition probability matrices Tij is grasped as, for example, a mountain-shaped characteristic group.

As described above, the attenuation type state transition matrix D is the sum of the state transition probability matrix T after time $\Delta t$ elapses to the state transition probability matrix $T^\infty$ after time $\Delta t \times \infty$ elapses, and is also a matrix that stores statistical proximity between all states. Further, in order to reduce a weight for a state transition to a distant future, a large amount of the attenuation rate γ is multiplied according to the elapsed time.

With Equation (1), which requires calculation from the state transition probability matrix T at a current time point to the state transition probability matrix $T^\infty$ after time elapses, calculation within real time is difficult. In view of the above, the present invention is characterized in that Equation (1) is converted into Equation (2) below. In short, Equation (2) is for performing calculation equivalent to the series of the state transition probability matrix when states of the simulation target and its surrounding environment in infinite time or an infinite step ahead are estimated in the form of probability density distribution.

[Equation 2]

$$D = T(E - \gamma T)^{-1} \quad (2)$$

In Equation (2), E is a unit matrix. Equation (2) is a calculation formula equivalent to Equation (1). By converting the calculation of the sum of the state transition probability matrix T in Equation (1) to the state transition probability matrix $T^\infty$ into an inverse matrix of $(E-\gamma T)$ in Equation (2), the same calculation result as Equation (1) is obtained in finite time. Here, in a case where the state transition probability matrix T is not linearly independent, a pseudo inverse matrix may be used. Further, instead of the attenuation type state transition matrix D, a matrix obtained by normalizing the attenuation type state transition matrix in each row may be used.

As described above, the present invention makes it possible to calculate the state transition probability after time $\Delta t \times k$ by calculating $T^k$ by using a model that simulates the behavior of a simulation target as a state transition model. Further, the sum from the state transition probability matrix T after the lapse of time $\Delta t$ to the state transition probability matrix $T^\infty$ after time $\Delta t \times \infty$ elapses is taken, and weighting is performed with the attenuation rate $\gamma$ according to the elapsed time, so that the state transition probability in consideration of elapse of time $\Delta t \times \infty$ can be calculated within finite time.

Figure 4:
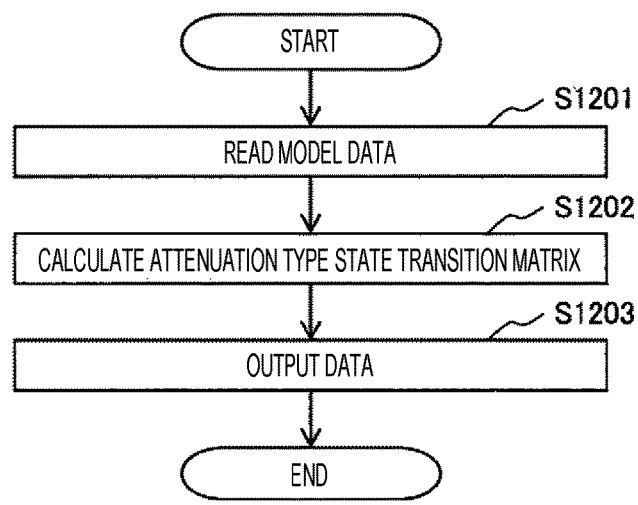
FIG. 4 is a diagram showing a process of processing performed by a processing device 100.

FIG. 4 is a diagram showing a process of processing performed by the processing device 100.

First, by processing of processing step S1201, data regarding a model of a simulation target is input from the data reading device 115 based on a command from the input control unit 141, and the data is recorded in the model storage unit 131.

Next, by processing of processing step S1202, the data regarding the model of a simulation target recorded in the model storage unit 131 is transferred to the future state prediction arithmetic unit 142, the attenuation type state transition matrix D is calculated based on Equation (2), and its result is recorded in the future state prediction result storage unit 132.

Finally, by processing of processing step S1203, the data recorded in a future state prediction result storage unit 136 is transferred to the output control unit 143 and output to the output device 120.

Second Embodiment

Figures 5, 6, 7:
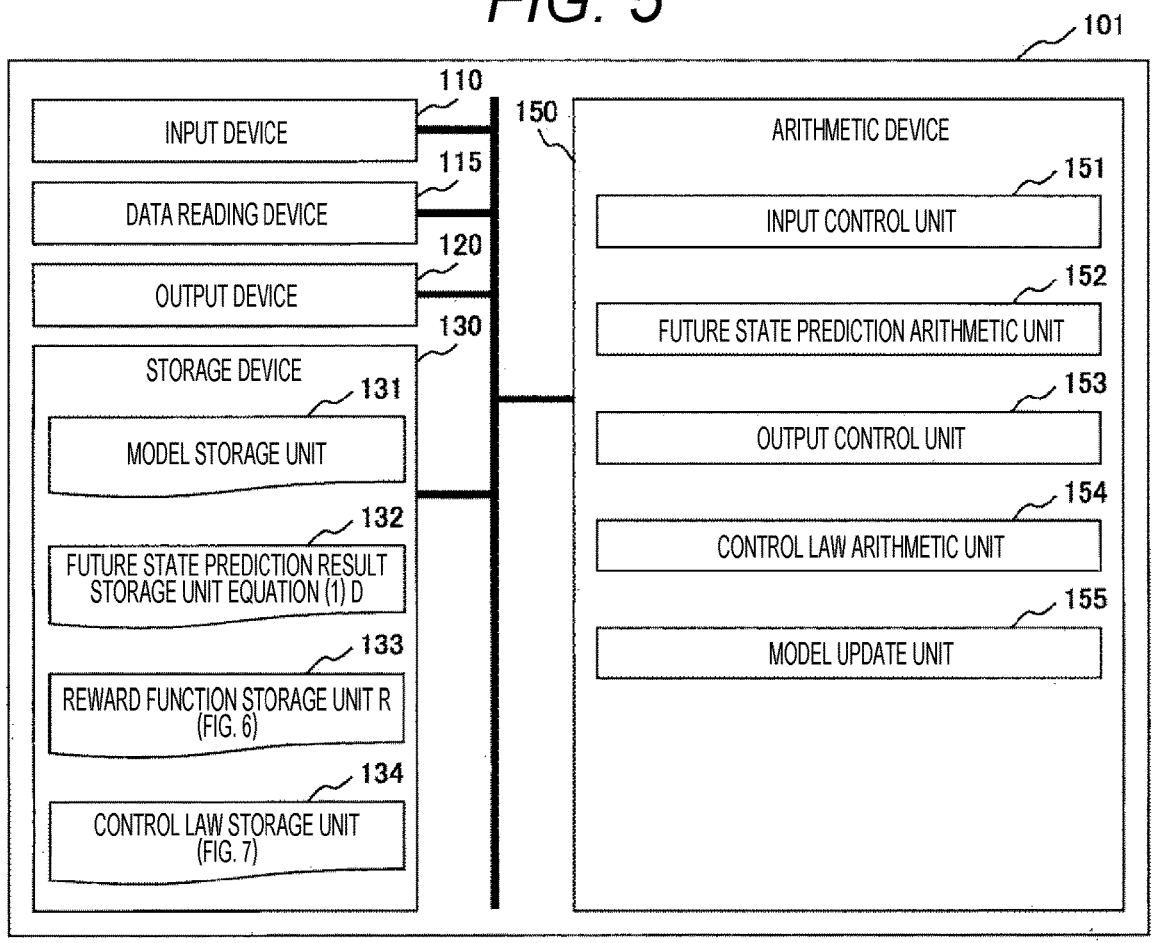
FIG. 5 is a configuration diagram showing an example of a processing device 101 obtained by expanding the processing device 100 according to the first embodiment to optimize model-based control.
FIG. 6 is a diagram showing an example of a case where a reward function is in a vector format.
FIG. 7 is a diagram showing an example of a control law stored in a control law storage unit 134.

FIG. 5 is a configuration diagram showing an example of the processing device 101 obtained by expanding the processing device 100 according to the first embodiment to optimize model-based control. A simulation target in the processing device 101 is the behavior of the control object and its surrounding environment, and a model stored in the model storage unit 131 also simulates the behavior of the control object and its surrounding environment. As described above, in a second embodiment, a case where a simulation target includes a control object is assumed.

The processing device 101 includes the input device 110, the data reading device 115, the output device 120, the storage device 130, and an arithmetic device 150 as main elements.

Of these, the input device 110 is a part that receives an instruction from an operator, and includes a button, a touch panel, and the like.

The data reading device 115 is a part that receives data from the outside of the processing device 100, and includes a CD drive, a USB terminal, a LAN cable terminal, a communication device, and the like.

The output device 120 is a device that outputs instruction information to an operator, a read image, a read result, and the like, and includes a display, a CD drive, a USB terminal, a LAN cable terminal, a communication device, and the like.

The above configurations are standard ones, and any or all of the input device 110, the data reading device 115, and the output device 120 may be connected to the outside of the processing device 100.

The storage device 130 includes the model storage unit 131, the future state prediction result storage unit 132, a reward function storage unit 133, and a control law storage unit 134. Of these, the future state prediction result storage unit 132 has substantially the same function as that of the first embodiment.

There is a case where the model storage unit 131 has the same function as that of the first embodiment, and there is also a case where the behavior of a simulation target changes not only in a state but also in an operation amount in control. In a case where the behavior of a simulation target changes according to an operation amount, the attenuation type state transition matrix can be calculated as in the first embodiment by adding information of the operation amount to the model.

The reward function storage unit 133 is a part that stores control targets such as a target position and a target speed in the form of fa unction, a table, a vector, a matrix, and the like. In the present invention, a function, a table, a vector, a matrix, and the like having information of this control target will be referred to as a reward function R. FIG. 6 shows an example of a case where a reward function is in a vector format. In FIG. 6, the reward function R is represented by a numerical value for each state ID of a transition source. According to this figure, the state s is handled as discrete space in which the whole is divided into n ranges, and the goal is make a transition from an initial state to a state s3. Here, an element value of a target vector is 1 in the state s3 and 0 in the other states. In the present invention, an element value of this vector and a value of the reward function R are referred to as rewards. As a reward for control, a desired value or an objective function at the time of reinforcement learning in AI is exemplified.

Returning to FIG. 5, the control law storage unit 134 is a part that stores an optimal control law for a control target. An example of the control law stored in the control law storage unit 134 is shown in FIG. 7. In FIG. 7, an operation amount ID is represented by a numerical value for each state ID (si) of a transition source. According to this figure, the state si is handled as discrete space in which the whole is divided into n ranges, and an optimal operation amount ac (c=1, 2, . . . , m) is stored for a range of each state. A method of calculating an optimal operation amount a will be described later.

Returning to FIG. 5, the arithmetic device 150 processes data input from the input device 110 and the data reading device 115 and data stored in the storage device 130, outputs a result of the processing to the output device 120 or records the result in the storage device 130, and includes processing units described below.

An input control unit 151 is a part that divides data input from the input device 110 or the data reading device 115 into commands, models, and the like, and transfers the data to each unit of a storage device and an arithmetic device.

A future state prediction arithmetic unit 152 is equivalent to the future state prediction arithmetic unit 142 of the first embodiment. Further, an output control unit 153 is also equivalent to the output control unit 143 of the first embodiment.

A control law arithmetic unit 154 calculates an optimal control law (optimal operation amount a) from the attenuation type state transition matrix D recorded in the future state prediction result storage unit 132 and the reward function R recorded in the reward function storage unit 133, and records the control law in the control law storage unit 134.

An example of a method of calculating an optimal control law is shown below. In the present example, calculation is performed in three stages below in order to obtain an optimum control law.

Stage 1: First, a function for storing closeness (or a statistical index indicating the ease of transition) between each of the states s and a state sgoal as a target in the reward function R is calculated. In the present invention, this function is referred to as a state value function V. Further, the state value function V may be stored in the form of a table, a vector, a matrix, or the like in addition to a function, and a storage format is not limited in the present invention. An example of a calculation method of the state value function V is shown in Equation (3) below.

[Equation 3]

$$V = RD \qquad (3)$$

As shown in Equation (3), the state value function V is the product of the attenuation type state transition matrix D and the reward function R. For example, as shown in FIGS. 2 and 6, in a case where the attenuation type state transition matrix D is an n-by-n matrix and the reward function R is an n-dimensional vector, the state value function V is an n-dimensional vector as shown in FIG. 8. An element value of the state value function V is higher in a state where transition to the state sgoal as a target is more likely. In the present invention, this element value is referred to as a value. Further, the state value function V of the present invention is equivalent in value to the definition of a state value function in a reinforcement learning method.

Stage 2: Next, using the state value function V, the state sj* that is most likely to make a transition to the state sgoal as a target among the states sj of a transition destination to which a transition can be made from the state si of a transition source is calculated. An example of the calculation method of the state sj* is shown in Equation (4) below.

[Equation 4]

$$s_j^* = \underset{s_i}{\mathrm{argmax}}(V(s_j)T(s_i, s_j)) \qquad (4)$$

Here, T(si, sj) is an element value in the row si and the column sj in the state transition probability matrix T. FIG. 9 shows an example of a calculation result of Equation (4). In FIG. 9, the state ID(sj) of a transition destination is represented for each state ID(si) of a transition source. According to FIG. 9, in a case where a state of a transition source is the state s1, states that may be a transition destination may be two, the state s1 and the state s2, in the state transition probability matrix T (FIG. 2). Of these two states, the state s2 has a higher value in the state value function V. For this reason, in the example of FIG. 9, the state s2 is stored as a state of a transition destination of the state s1 of a transition source.

Stage 3: In the final stage, the operation amount a required to make a transition from each of the states si of a transition source to the state sj* obtained in Stage 2 is calculated. The operation amount a can be calculated, for example, by obtaining an inverse model of the model storage unit 131 (a model in which the state si and the state sj* of a transition source are input and the corresponding operation amount a is output). As a calculation result of Stage 3, for example, a control law as shown in FIG. 6 is obtained.

Calculation of a value with Equation (3) as described above enables evaluation of the likeliness of transition to sgoal of each state, Equation (4) enables identification of the state sj* that is most likely to make a transition to sgoal among the states to which transition can be made by elapse of time Δt, and the inverse model enables identification of the operation amount a for making a transition to the state sj*.

Returning to FIG. 5, a model update unit 155 modifies model data based on update data when the update data of the model data recorded in the model storage unit 131 is input from the data reading device 115, and records the modified model data in the model storage unit 131.

Figure 10:
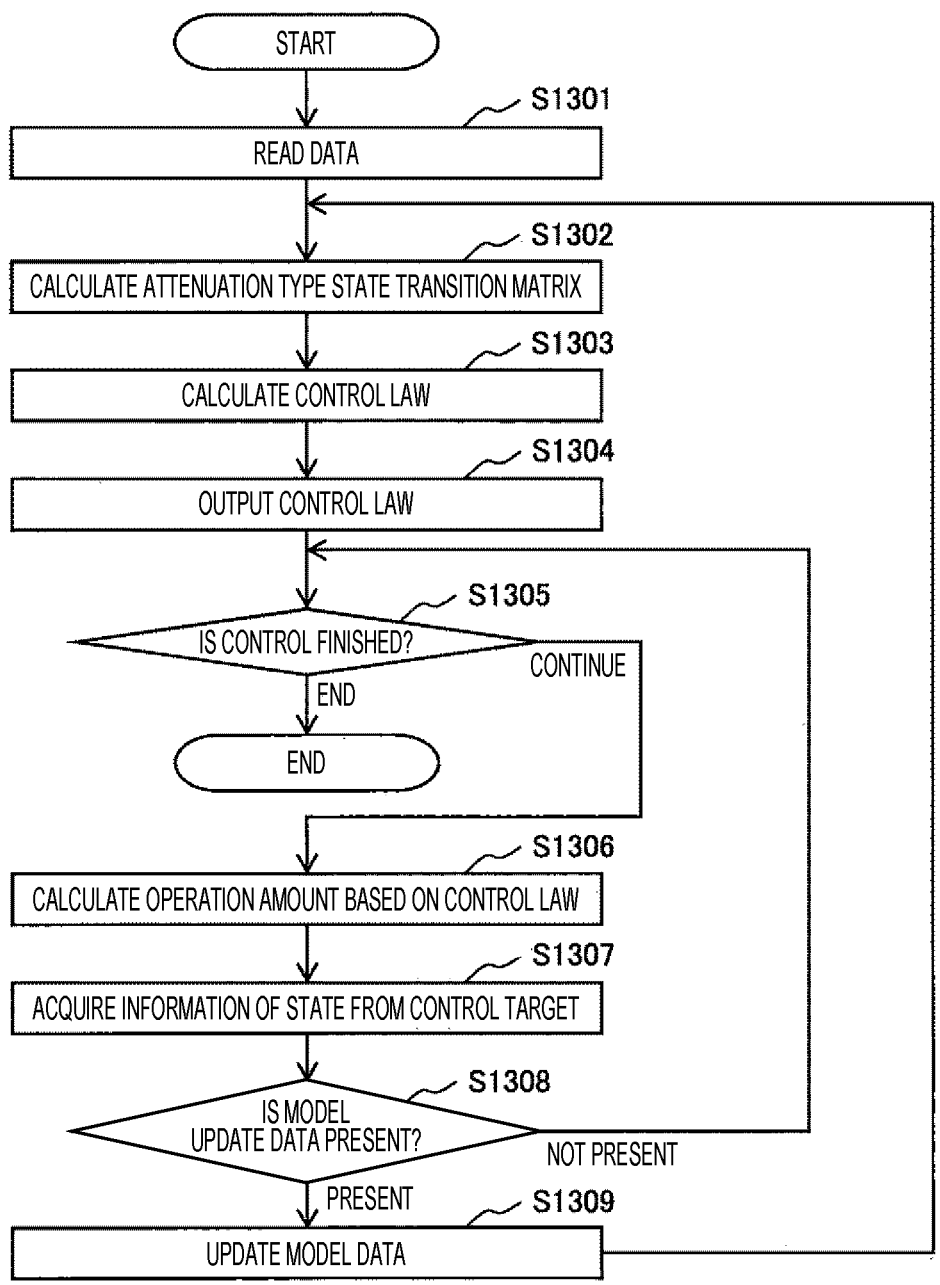
FIG. 10 is a diagram showing a process of processing performed by the processing device 101.

FIG. 10 is a diagram showing a process of processing performed by the processing device 101.

First, in processing step S1301 of FIG. 10, data regarding a model of a simulation target and data regarding the reward function R are input from the data reading device 115 based on a command from the input control unit 141, and the pieces of the data are recorded in the model storage unit 131 and the reward function storage unit 133.

Next, in processing step S1302, the data regarding the model of a simulation target recorded in the model storage unit 131 is transferred to the future state prediction arithmetic unit 142, the attenuation type state transition matrix D is calculated based on Equation (2), and its result is recorded in the future state prediction result storage unit 132.

Next, in processing step S1303, the attenuation type state transition matrix D recorded in the future state prediction result storage unit 132 and the reward function R recorded in the reward function storage unit 133 are transferred to the control law arithmetic unit 154, an optimal control law is calculated, and its result is recorded in the control law storage unit 134.

Next, in processing step S1304, pieces of the data recorded in the future state prediction result storage unit 136 and the control law storage unit 134 are transferred to the output control unit 143 and output to the output device 120.

Next, in processing step S1305, a control object determines whether or not to finish the control. In a case where the control is to be continued, the processing proceeds to processing step S1306, and in a case where the control is to be finished, the process is also finished.

Next, in processing step S1306, the control object calculates the operation amount a based on the control law sent from the output device 120 to the control object, and executes operation.

Next, in processing step S1307, the control object transmits states of the control object and its surrounding environment measured before and after the operation is executed to the data reading device 115.

Next, in processing step S1308, the input control unit 141 determines whether or not the data reading device 115 receives data of states of the control object and its surrounding environment measured before and after the execution of the operation. In a case where the data is received, the processing proceeds to processing step S1309, and in a case where the data is not received, the processing returns to processing step S1305.

In processing step S1309, in a case where the data reading device 115 receives data of states of the control object and its surrounding environment measured before and after the execution of the operation in the processing of processing step S1308, the received data and model data recorded in the model storage unit 131 are transferred to the model update unit 155, and updated model data is recorded in the model storage unit 131. After the above, the processing proceeds to processing step S1302.

Third Embodiment

Figures 13, 14:
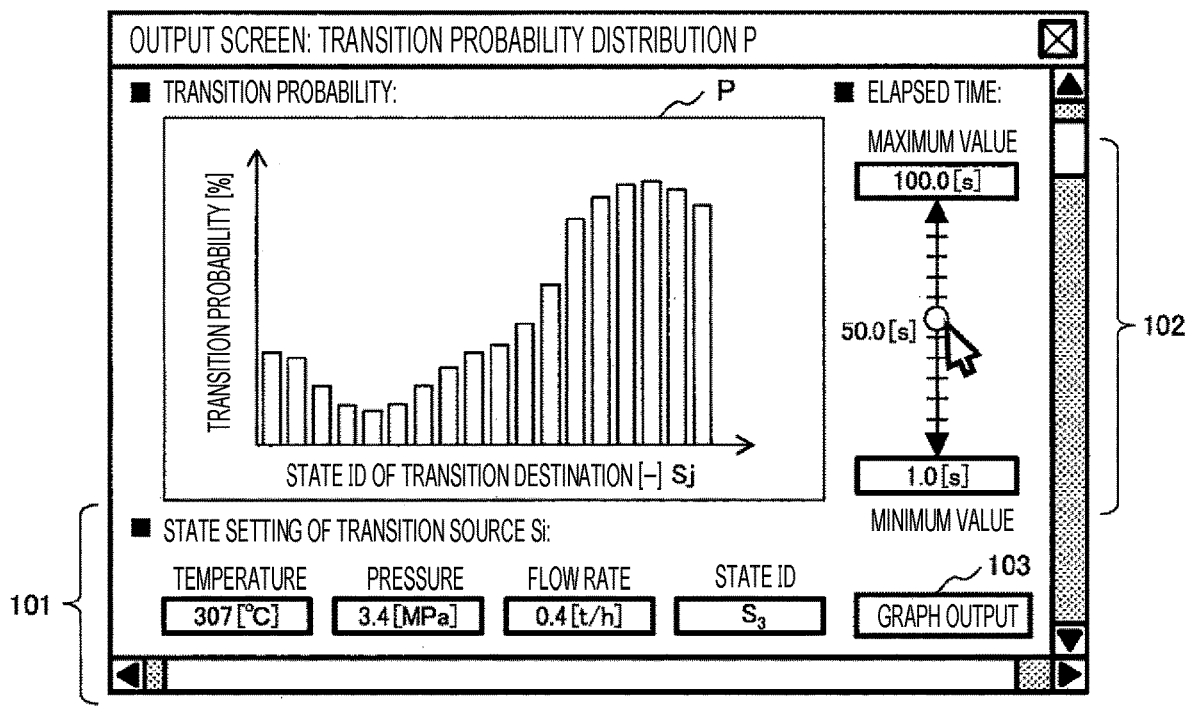
FIG. 13 is a diagram showing an example in which transition probability distribution P is displayed as data obtained by processing model data stored in the model storage unit 131.
FIG. 14 is a diagram showing a correspondence table created in advance for a relationship between an ID of a state and a temperature, pressure, and a flow rate.

FIGS. 11, 12, and 13 are examples of a screen displayed on the output device 120 in the first and second embodiments.

FIG. 11 shows the state transition probability matrix T displayed on a screen as an example of model data recorded in the model storage unit 131. In the figure, the state transition probability matrix T is displayed on a screen in a matrix format with the movement source state si and the movement destination state sj as an example of a storage format of a model, and element values of the matrix may be updated from the present screen through the input device 110.

FIG. 12 shows an example of a case where the attenuation type state transition matrix D stored in the future state prediction result storage unit 132 is displayed on a screen. In the figure, the attenuation type state transition matrix D is displayed on a screen in a matrix format with the movement source state si and the movement destination state sj. Note that, instead of the attenuation type state transition matrix D, a matrix obtained by normalizing the attenuation type state transition matrix D in each row may be displayed on the screen.

FIG. 13 is an example of a case where transition probability distribution P is displayed as data obtained by processing model data stored in the model storage unit 131. On a screen, the transition probability P is displayed with the state sj of a transition destination in the horizontal axis.

Further, a state setting section 101 of the transition source si, a graph output section 103, and an elapsed time setting section 102 are formed on the screen. In the state setting section 101 of the transition source si, a state of a transition source is input through the input device 110. Here, s3 is shown as an example and is assumed to be input. Specific examples of states of a transition source at the time of input s3 are a temperature, pressure, and a flow rate of a simulation target. Here, when a3 is input from a state ID button, the state ID is converted into values of a temperature, pressure, and a flow rate of the simulation target.

This conversion can be realized by creating in advance a correspondence table of an ID, a temperature, pressure, and a flow rate as shown in FIG. 14. In this example, since s3 is selected, the temperature of 307 degrees, the pressure of 3.4 MPa, and the flow rate of 0.4 t/h of a simulation target are displayed.

Further, in the graph output section 103 of FIG. 13, when a graph output button is pressed, a diagram in which an element value of the attenuation type state transition matrix of a row corresponding to a state ID set in advance is graphed is displayed on a screen.

Further, in the elapsed time setting section 102, an appropriate time interval Δt can be set within a range of maximum and minimum time set in advance. By designating the time range, the attenuation type state transition matrix D within the designated time range is displayed. The attenuation type state transition matrix D in a case where the time range is limited is obtained, for example, by Equation (5) described below.

[Equation 5]

$$D = \gamma^{\frac{t_{min}}{\Delta t}-1} T^{\frac{t_{min}}{\Delta t}} + \ldots + \gamma^{\frac{t_{max}}{\Delta t}-1} T^{\frac{t_{max}}{\Delta t}} \tag{5}$$

Here, $t_{min}$ is a minimum value of the designated time range, $t_{max}$ is a maximum value of the designated time range, and Δt is a time interval set in advance. Further, by adjusting the scrolling on the right side of the screen, it is possible to display the attenuation type state transition matrix D of when a specific time elapses on the screen. The attenuation type state transition matrix D of when a designated time elapses is obtained, for example, by Equation (6) described below.

[Equation 6]

$$D = \gamma^{\frac{t_p}{\Delta t}-1} T^{\frac{t_p}{\Delta t}} \tag{6}$$

Here, tp is a designated elapsed time. In the example of the screen of FIG. 12, the attenuation type state transition matrix D in a case where tp is 50 seconds is displayed. With a graph displayed on the present screen, it is possible to check the probability p of transition from a state of a transition source to each state within the designated elapsed time tp or a time range from $t_{min}$ to $t_{max}$.

Fourth Embodiment

FIGS. 15, 16, 17, and 18 are examples of screens displayed on the output device 120 in the second embodiment.

FIG. 15 is an example of a case where tables of the reward function R recorded in the reward function storage unit 133, a control law recorded in the control law storage unit 134, a state value function calculated in the control law arithmetic unit 154, and the state sj* for the state si of a transition source calculated in the control law arithmetic unit 154 are displayed on the screen. An element value of the reward function may be updated from the present screen through the input device 110. Further, by bringing a mouse cursor close to the state ID in the screen, values of a temperature, pressure, and a flow rate corresponding to the state ID may be displayed on the screen based on an example of the table as shown in FIG. 14.

Figure 16:
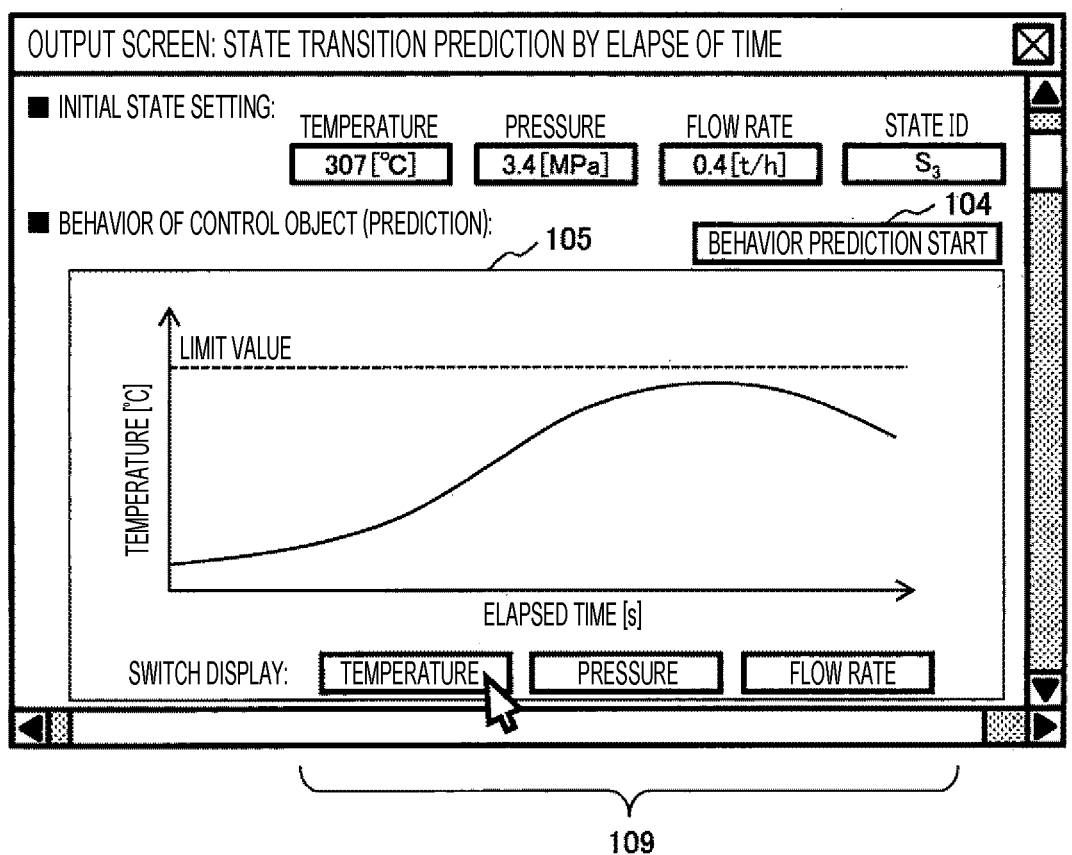
FIG. 16 is a diagram showing an example in which a graph 105 that predicts how states of a control object and its surrounding environment change as time elapses is displayed on a screen by control using a control law.

FIG. 16 is an example, in which a graph 105 that predicts how states of a control object and its surrounding environment change as time elapses is displayed on a screen by control using a control law recorded in the control law storage unit 134. After an initial state is set on a screen, a behavior start button 104 is pressed, so that transition of a state with respect to elapse of time can be checked. As in the example, in a case where the state is associated with three of a temperature, pressure, and a flow rate, a button 109 for switching the display may be set to display one by one.

FIG. 17 is an example of a screen displayed on a screen when model data recorded in the model storage unit 131 is updated in processing step S1309 of FIG. 10 and the screen of FIG. 12. On the present screen, update content of a model (before and after update), update content of a control law accompanying update of a model (before and after update), a change in a state transition prediction result due to elapse of time equivalent to that of FIG. 16 due to update of a control rule (before and after update), and buttons 106, 107, and 108 for designating whether or not model update is possible are displayed. When the model update permission button 106 is pressed, processing step S1309 in FIG. 10 is executed, and when the decline button 107 is pressed, 1309 is not executed. Further, when a hold button processing step S is pressed, processing step S1309 is not executed. However, the same screen can be read again even after the hold button 108 is pressed.

FIG. 18 is an example of a screen different from that of FIG. 17 in a method of displaying update content (before and after update) of a model. In FIG. 17, a state of a transition source as an update target, a state after transition, and its transition probability are displayed, whereas in FIG. 18, state transition matrices before and after update are displayed.

On the display screens of FIGS. 17 and 18, update content of a model, update content of a control law accompanying update of a model, and a change in a state transition prediction result by elapse of time equivalent to that of FIG. 16 due to update of a control law are displayed. In this manner, it is possible to easily check an influence on a control object by a control law or a result of control due to update of a model, and it is possible to smoothly determine whether or not to update the model based on the influence on the control object.

REFERENCE SIGNS LIST

100, 101 processing device
110 input device
115 data reading device
120 output device
130 storage device
131 model storage unit
132 future state prediction result storage unit
133 reward function storage unit
134 control law storage unit
140, 150 arithmetic device
141, 151 input control unit
142, 152 future state prediction arithmetic unit
143, 153 output control unit
154 control law arithmetic unit
155 model update unit

The invention claimed is:

1. A future state estimation device comprising:
a model storage unit that stores a model for simulating a simulation target and a surrounding environment of the simulation target;
a future state prediction result storage unit that stores information obtained by estimating future states of the simulation target and a surrounding environment of the simulation target in infinite time or a time step ahead within finite space in a form of probability density distribution; and
a future state prediction arithmetic unit that performs calculation equivalent to a series using a model for simulating future states of the simulation target and a surrounding environment of the simulation target in a form of probability density distribution;
an input device configured to receive inputs from an operator for controlling operation of the future state estimation device; and
a data reading device configured to communicate with a control object and receive measurements of a state and a surrounding environment of the control object before and after an operation of the control object;
wherein the model is updated based on the measurements of the state and the surrounding environment of the control object.

2. The future state estimation device according to claim 1, wherein the future state prediction arithmetic unit performs calculation equivalent to a series of a state transition probability matrix in estimating states of the simulation target and a surrounding environment of the simulation target in infinite time or an infinite step ahead in a form of probability density distribution.

3. The future state estimation device according to claim 1, wherein when the future state prediction arithmetic unit estimates states of the simulation target and a surrounding environment of the simulation target in infinite time or an infinite step ahead in a form of probability density distribution, calculation time does not depend on any one or more of a distance, time, and a step to a future state to be estimated.

4. The future state estimation device according to claim 1, the future state estimation device further comprising a control law arithmetic unit that calculates an operation amount of the control object by using an estimation result of states of the simulation target and a surrounding environment of the simulation target in infinite time or an infinite step ahead estimated in the future state prediction arithmetic unit.

5. A future state estimation device comprising:
a model storage unit that stores a model for simulating a simulation target and a surrounding environment of the simulation target;
a future state prediction result storage unit that stores information obtained by estimating future states of the simulation target and a surrounding environment of the simulation target in infinite time or a time step ahead within finite space in a form of probability density distribution;
means for performing calculation equivalent to a series using a model for simulating a simulation target and a surrounding environment of the simulation target; and
a model update unit that updates information of the model storage unit by using information and data on transition of a state;
an input device configured to receive inputs from an operator for controlling operation of the future state estimation device; and
a data reading device configured to communicate with a control object and receive measurements of a state and a surrounding environment of the control object before and after an operation of the control object;
wherein the model is updated based on the measurements of the state and the surrounding environment of the control object.

6. The future state estimation device according to claim 5, the future state estimation device further comprising:

a control law storage unit that stores optimal operation according to a purpose and a state of operation in the control object;

a reward function storage unit that stores information on a purpose of operation such as a reward function and an objective function; and a control law arithmetic unit that outputs an optimal control law according to a purpose and a state of operation in the control object by using information stored in the future state prediction result storage unit and the reward function storage unit.

7. The future state estimation device according to claim 5, comprising displaying means, wherein any two or more of a model before update, a model after update, and information on a difference between models before and after update are output to the displaying means.

8. A future state estimation device according to claim 5, comprising displaying means, wherein probability of transition from a state of a transition source to each state in any one or more of a designated elapsed time, an elapsed step, a time range, and a step range is displayed on the displaying means.

9. The future state estimation device according to claim 5, comprising displaying means, wherein on the display means, any two or more of a model before update, a model after update, and information on a difference between models before and after update; any two or more of a control law before model update, a control law after model update, and information on a difference between control laws between before and after model update, any two or more of a transition prediction result of a state by elapse of time before model update, a transition prediction result of a state by elapse of time after model update, and information on a difference between transition prediction results of states by elapse of time before and after model update; and means for designating whether or not model update is possible are displayed.

10. A future state estimation method comprising:

storing a model for simulating a simulation target and a surrounding environment of the simulation target;

storing information obtained by estimating future states of the simulation target and a surrounding environment of the simulation target in infinite time or a time step ahead within finite space in a form of probability density distribution; and performing calculation equivalent to a series using a model for simulating future states of the simulation target and a surrounding environment of the simulation target in a form of probability density distribution;

receiving inputs from an operator for controlling operation of the future state estimation method;

communicating with a control object and receiving measurements of a state and a surrounding environment of the control object before and after an operation of the control object; and updating the model based on the measurements of the state and the surrounding environment of the control object.

11. The future state estimation method according to claim 10, wherein calculation equivalent to a series of a state transition probability matrix is performed in estimating states of the simulation target and a surrounding environment of the simulation target in infinite time or an infinite step ahead in a form of probability density distribution.

12. The future state estimation method according to claim 10, wherein when estimating states of the simulation target and a surrounding environment of the simulation target in infinite time or an infinite step ahead in a form of probability density distribution, calculation time does not depend on any one or more of a distance, time, and a step to a future state to be estimated.

13. The future state estimation method according to claim 10, wherein the simulation target includes a control object, the future state estimation method further comprising calculating an operation amount of the control object by using an estimation result of states of the simulation target and a surrounding environment of the simulation target in infinite time or an infinite step ahead estimated in the future state estimation method.

14. A future state estimation method, comprising:

in estimating a future state using a model that simulates behavior of a simulation target, storing, for a state of a transition source and a state of a transition destination before and after state transition, probability that the state of a transition source becomes the state of a transition destination as a state transition probability matrix; and obtaining an attenuation type state transition matrix which is a sum of the state transition probability matrices added with a weight that decreases more for a more distant future in a plurality of transitions;

receiving inputs from an operator for controlling operation of the future state estimation method;

communicating with a control object and receiving measurements of a state and a surrounding environment of the control object before and after an operation of the control object; and updating the model based on the measurements of the state and the surrounding environment of the control object.

15. The future state estimation method according to claim 14, wherein the attenuation type state transition matrix is obtained by performing calculation equivalent to a series of a state transition probability matrix.

* * * * *